United States Patent [19]

Pearson

[11] Patent Number: 4,507,856
[45] Date of Patent: Apr. 2, 1985

[54] METHOD OF ASSEMBLING MULTICELL ELECTRIC STORAGE BATTERIES

[75] Inventor: Ernest J. Pearson, Swinton, England

[73] Assignee: Chloride Group Public Limited Company, London, England

[21] Appl. No.: 547,234

[22] Filed: Oct. 31, 1983

[30] Foreign Application Priority Data

Oct. 29, 1982 [GB] United Kingdom ............... 8230958

[51] Int. Cl.³ ........................................ H01M 6/00
[52] U.S. Cl. ............................ 29/623.1; 29/623.3; 29/730
[58] Field of Search ............... 29/623.1, 623.3, 730; 429/225–228

[56] References Cited

U.S. PATENT DOCUMENTS

| | | | |
|---|---|---|---|
| 3,775,190 | 11/1973 | Oakley | 29/623.3 |
| 4,016,633 | 4/1977 | Smith et al. | 29/623.1 |
| 4,253,232 | 3/1981 | Bennett et al. | 29/623.1 |
| 4,331,747 | 5/1982 | Julian et al. | 429/160 |

FOREIGN PATENT DOCUMENTS 1430205 3/1976 United Kingdom .
2070844 9/1981 United Kingdom .

*Primary Examiner*—Charles F. Lefevour
*Attorney, Agent, or Firm*—Finnegan, Henderson, Farabow, Garrett & Dunner

[57] ABSTRACT

A method of assembling a multicell lead acid battery includes forming a laminated structure from a plurality of flat plate arrays. Each array comprises positive and negative plates connected to at least one further plate in the same array by at least one link. The arrays are superposed so that each plate is in registry with a plate of opposite polarity in the adjacent array and separated from it by separator material. One or more cuts are made to sever selected links to form a plurality of stacks of plates of alternating polarity which constitute the individual cells in the finished battery with each plate, with the exception of every other plate in the two electrical end stacks of plates, electrically connected by one or more integral links to only a plate of opposite polarity in the same array and with every alternate plate in the two electrical end stacks of plates connected to no other plate. In the finished battery each plate in each cell lies in a common plane with one plate in every other cell.

37 Claims, 14 Drawing Figures

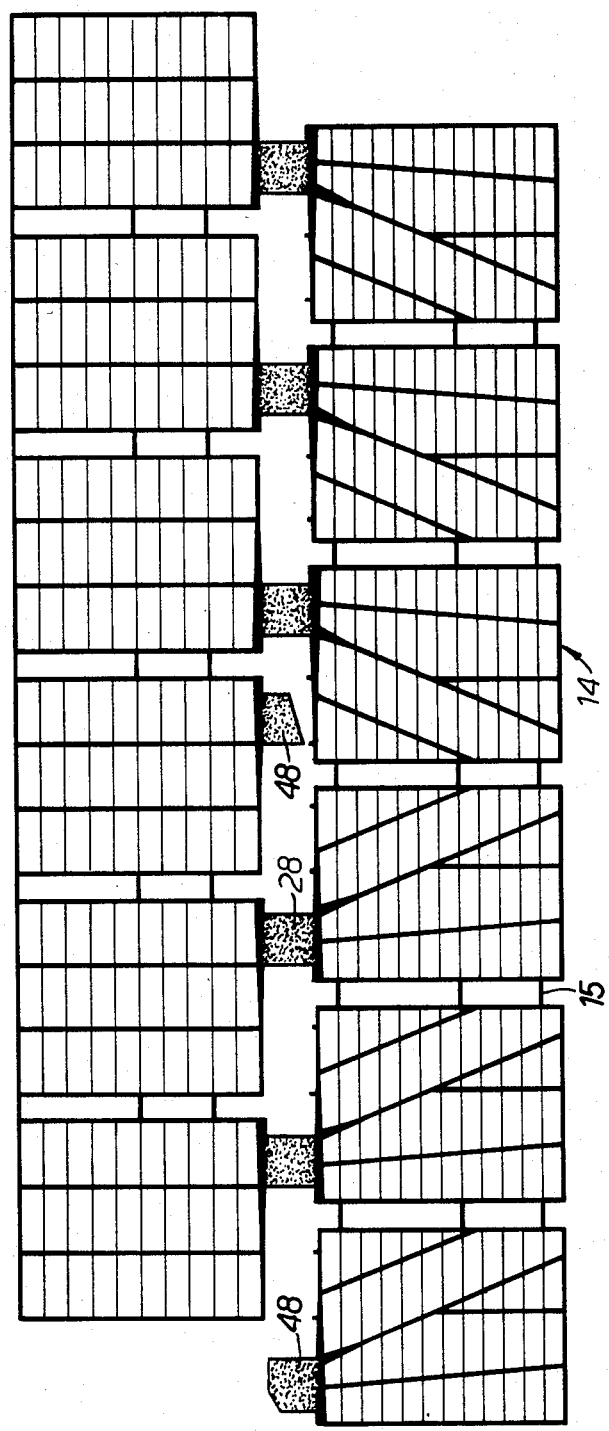

METHOD OF ASSEMBLING MULTICELL ELECTRIC STORAGE BATTERIES

The present invention relates to a method of assembling multicell electric storage batteries, particularly of the type containing substantially no mobile electrolyte, e.g. batteries in which the electrolyte is in gel form or recombination batteries in which substantially all the electrolyte is absorbed in the plates and separators. The invention is concerned in particular with such batteries of lead acid type. Recombination batteries are those which contain a reduced amount of electrolyte such that substantially all the electrolyte is absorbed in the plates and separators and in which the gas evolved within them during operation or charging is not normally vented to the atmosphere but is induced to recombine within the battery.

Conventional lead acid batteries include a plurality of cells containing alternating positive and negative plates each of which has an upstanding plate lug. The cells are electrically connected but electrolytically isolated by intercell partitions which are integral with the container and which are sealed to the lid and the plates of each polarity in each cell are connected together by a respective plate strap and plate straps of opposite polarity in adjacent cells are connected together by an intercell connector. The steps of forming the plate straps and forming the intercell connectors are frequently combined, but nevertheless this is a time consuming and thus expensive operation which requires a substantial amount of lead or lead alloy. The electrical paths through the plate straps and intercell connectors are relatively long with the result that the battery has an appreciable internal resistance. Furthermore the grids which act as carriers for the active material of the plates and thus the plates themselves are made relatively thick so as to exhibit the rigidity which is essential if the plates are to withstand the forces to which they are subject during the assembly of the battery. This thickness of the plates results in their including more lead than is necessary as regards electrochemical requirements and a utilisation of the active material which is substantially less than the theoretical maximum.

It is highly desirable to minimise the amount of lead or lead alloy used in the plates and in the plate straps and intercell connectors and, if possible, to eliminate the steps of forming the plate straps and intercell connectors all together. It is also desirable that the intercell current paths should be as short as possible thereby reducing the internal resistance of the battery and thus increasing its maximum output current and thus its cranking power in the case of an automotive battery. British Patent Specification No. 2070844 of the present applicants discloses a multicell electric storage battery of recombination type in which every alternate electrode in the two end cells is a unipolar plate whilst all the remaining electrodes are one half of a bipolar plate which is connected to its other half in an adjacent cell by a bridge piece which passes around one side of the intercell partitions separating the two cells. Each electrode is therefore integrally connected to an electrode of the opposite polarity in an adjacent cell by a bridge piece and there is thus no need to form separate plate straps or intercell connectors.

In addition, the intercell current paths are of minimum length and the battery thus has a very low internal resistance.

Whilst the battery disclosed in this prior specification is very advantageous as regards its low internal resistance and the elimination of the steps of forming plate straps and intercell connectors, it is somewhat complex to assemble since the assembly is a manual operation in which the electrodes are inserted successively into the container.

Accordingly, it is an object of the present invention to provide a method of assembling a multicell electric storage battery, particularly of the type containing substantially no mobile electrolyte, which requires a reduced amount of labour, in particular handling of the plates, and in which the necessity of separately forming plate straps and intercell connectors is eliminated.

According to a first aspect of the present invention there is provided a method of assembling a multicell electric storage battery of the type comprising a plurality of cells electrically connected in series with each plate in each cell being substantially coplanar with one plate in every other cell comprising forming a laminated structure from a plurality of superposed substantially planar plate arrays, each array comprising both positive and negative plates and each plate being connected to at least one further plate in the same array by at least one link, the arrays being superposed in the laminated structure so that the plates of each array are in registry with those of the or each adjacent array and superposed plates of adjacent arrays are of opposite polarity and separated by separator material, and forming one or more cuts to sever selected links thereby forming a plurality of stacks of plates of alternating polarity, which stacks constitute the individual cells in the finished battery, with each plate, with the exception of every other plate in the two electrical end stacks of plates, electrically connected by one or more integral links to only a plate of opposite polarity in the same array, which unsevered links constitute the intercell connectors in the finished battery, but with every alternate plate in the two electrical end stacks of plates connected to no other plate.

Thus in the method of the present invention it is not necessary to handle the plates individually but instead they are handled in the form of plate arrays, each of which provides a single plate for each cell of the battery. The plates of each array are interconnected by a combination of temporary links which are subsequently severed in the laminated structure and integral links or bridge pieces which remain intact and serve as intercell connectors in the finished battery, thereby obviating the necessity of forming separate plate straps and intercell connectors.

It will be appreciated that the cells of the finished battery and thus the plates of the individual arrays may be disposed in any configuration. It is, however, preferred as regards the shape and layout of the finished battery and also manufacturing convenience that the plates of each array are arranged in two lines.

Thus in accordance with a further aspect of the present invention there is provided a method of assembling an electric storage battery including providing a plurality of elongate plate arrays each having two rows of battery plates extending side by side, the plates of each row being connected and certain plates being electrically connected by regularly spaced bridge pieces to a plate in the other row, forming a laminated structure by superposing the plate arrays interleaved with sheets of separator material in such a manner that each plate of each plate array is adjacent to a plate of opposite polarity on the adjacent plate array or arrays and the bridge pieces of adjacent plate members are offset in the direction of the length of the rows and are thus situated in a plurality of stacks spaced apart in the direction of the length of the laminated structure, forming a plurality of cuts in each side of the laminated structure, the cuts on the two sides being offset in the direction of the length of the laminated structure thereby forming two lines of stacks of plates of alternating polarity of which certain plates of each line are connected to a plate of opposite polarity in the other line by a respective bridge piece and severing the laminated structure into a plurality of battery elements.

Thus in accordance with this aspect of the present invention an elongate laminated structure is formed, either in a batch process or continuously, and the laminated structure is then cut up into individual battery elements by severing adjacent plates in the two rows and also selected stacks of bridge pieces, if necessary. The battery elements may have two or more cells in which case the resultant battery will be a multicell battery or every plate may be separated from the or each adjacent plate and every stack of bridge pieces severed in which case the resulting battery elements will comprise a single cell and the term "battery" as used herein is to be interpreted accordingly.

According to a further aspect of the present invention a method of assembling a multicell electric storage battery comprises providing a plurality of elongate plate arrays each having two rows of battery plates extending side by side, the plates of each row being connected and certain plates being electrically connected by regularly spaced bridge pieces to a plate in the other row, forming a laminated structure by superposing the plate arrays interleaved with sheets of separator material in such a manner that each plate of each plate array is adjacent to a plate of opposite polarity of the adjacent plate array or arrays and the bridge pieces of adjacent plate arrays are offset in the direction of the length of the rows and are thus situated in a plurality of stacks spaced apart in the direction of the length of the laminated structure, forming a plurality of cuts in each side of the laminated structure, the cuts on the two sides being offset in the direction of the length of the laminated structure thereby forming a battery element comprising two lines of stacks of plates of alternating polarity of which certain plates in each line are connected to a plate of opposite polarity in the other line by a respective bridge piece.

Thus according to this further aspect of the present invention the plate arrays may be formed or cut to the desired length prior to forming the laminated structure and the laminated structure is not cut up to separate it into individual battery elements since the laminated structure itself constitutes a battery element after the cuts have been formed in it to separate adjacent plates from one another.

Thus the battery is assembled by a method in which it is not necessary to form individual plates and then to assemble them into individual plate packs as is conventional but instead plate arrays, e.g. elongate arrays comprising two lines of plates are superposed and appropriate cuts are then made to divide them into individual cell packs and selected bridge pieces are then severed, if necessary, to provide battery elements comprising the requisite number of cells for subsequent insertion into a container as a single unit. The plate arrays may include cast grids or expanded grids formed by expanding a metallic strip leaving a central unexpanded land from which portions are subsequently removed leaving only spaced portions connecting the two expanded areas which portions constitute the bridge pieces. The grids of the arrays are then pasted with positive and negative active electrode material respectively or alternatively they are pasted with the same universal active material which is capable of subsequently being formed into either positive or negative active material. Alternatively, a metallic strip may be expanded over its entire area and portions subsequently removed from its central area leaving spaced expanded portions connecting the two active areas. The two halves of the expanded strip are then pasted with active electrode material, as described above, and it will be appreciated that since the spaced portions connecting the two active areas are of expanded metal rather than solid metal it is desirable that these should be somewhat longer than in the case in which they are of solid metal so as to ensure that they provide the requisite conductivity.

It will be appreciated that various steps in the method can be carried out at different points in the method. Thus the plurality of cuts in each side of the laminated structure may be formed either before or after selected stacks of bridge pieces are severed and electrolyte may be added either before or after the battery elements are inserted into a container.

In one embodiment the battery element includes four or more cells and the method includes placing it in a container which is of substantially rectangular section with one or more intercell partitions integral with each side wall, the intercell partitions extending substantially only to the centre of the container and being offset from the intercell partitions on the other side of the container. In this case no positive step is required to ensure that adjacent stacks of plates, which constitute cells in the finished battery, are electrically separated from one another but if no such integral partitions are present each stack of plates may be placed in a plastics bag prior to placing it in a container.

The cuts in the laminated structure may be formed by any appropriate method, but care must be taken to ensure that the method does not burr the edge of one plate sufficiently far that it contacts an adjacent plate since this would constitute an internal short circuit in the finished battery. It is found that these cuts may be reliably formed by a high speed band saw. The cut edges of each cell pack may be sharp and relatively unstable and it may therefore be desirable to place a stabilising member, e.g. a strip of the same separator material, in contact with each cut surface, i.e. two such members per cell pack, which then engage both the cut edges and the intercell partitions and ensures the mechanical integrity of the former and provides a barrier to lead growth thereby protecting the battery from internal short circuits.

As referred to above, the plate arrays may include an expanded metal grid, e.g. of lead or lead alloy in the case of a lead acid battery, and it will be appreciated that in this event the individual plates in each line or row of plates are not identifiable as such until the cuts have been formed to separate adjacent plates from one another. Similarly the temporary links, that is to say the positions where the cuts are to be formed in the plate arrays may not be identifiable as such prior to the formation of the cuts. Preferably however each plate array includes cast grids, preferably produced by continuous casting, and in this case the individual plates may be individually identifiable prior to their being separated. In this event, the individual plates may be connected prior to their separation by identifiable temporary links constituting one or more integrally cast bars. These bars of each plate array are preferably so disposed that when a laminated structure is built up from superposed plate arrays the bars of adjacent plate arrays are not directly superposed but are offset from one another which results in a reduced risk of these bars being pressed into contact with one another when the cuts are formed in the laminated structure which would otherwise lead to internal short circuits within the finished battery.

The battery may be of flooded electrolyte type, in which case the separator may be of conventional type, i.e. microporous PVC. It is necessary to take great care in this construction to ensure that the cells are electrolytically sealed from one another. Adjacent cells which are not directly connected by the bridge pieces may be separated by providing intercell partitions, preferably integral with the bottom and two side walls of the container. These preferably extend approximately half way across the width of the container in the case in which the bridge pieces all extend between two lines of cells, the partitions on the two sides of the container being of necessity offset from one another, e.g. by substantially half a pitch and sealed to the battery lid. Those cells which are not directly connected, e.g. the two lines of cells, may be sealed from each other by moulding a partition to form a seal with the bridge pieces in situ in the container by pouring in a settable material, such as epoxy resin. Alternatively, an integral intercell partition may be provided with slots to accommodate the integral bridges which are subsequently sealed by e.g. epoxy resin or hot melt adhesive. In both cases the intercell partitions must also be sealed to the battery lid.

The present invention is however more applicable to batteries of the type containing substantially no mobile electrolyte, e.g. of recombination type. In this latter event, the electrolyte is present in the cells in a reduced amount, that is to say an amount such that there is substantially no free unabsorbed electrolyte, and the separator material is compressible fibrous and absorbent, preferably microfine glass fibre material. In this event, it is still highly desirable that cells which are adjacent but not directly connected be separated by and intercell partition since otherwise the separator material of one cell might contact that of an adjacent cell thus providing an intercell ionic leakage path. These intercell partitions need not be fixed within the container and may thus be constituted by the material of plastics bags within which each cell is accommodated or alternatively by in situ moulded partitions, e.g. of hot melt adhesive. In any event, it is not essential in this construction that the cells be completely sealed from each other and thus the intercell partitions need not be sealed to the lid since in batteries of this type with substantially no mobile electrolyte there is believed to be no, or at least a substantially diminished, risk of intercell ionic leakage currents occurring.

Further features and details of the present invention will be apparent from the following description of certain specific embodiments which is given by way of example only with reference to the accompanying drawings, in which:

FIGS. 8 and 10 are views similar to FIG. 7 showing modified constructions of cast grid array.

Figure 2:
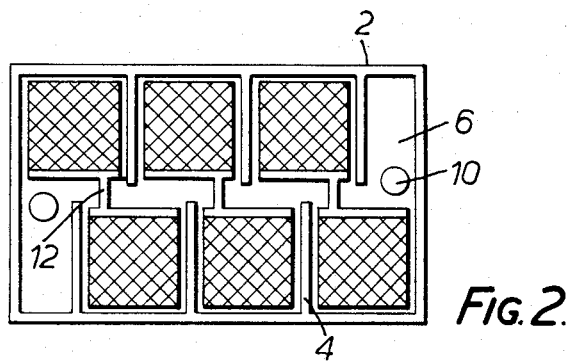
FIG. 2 is a plan view of the battery of FIG. 1 showing only the top layer of plates.
Figure 3:
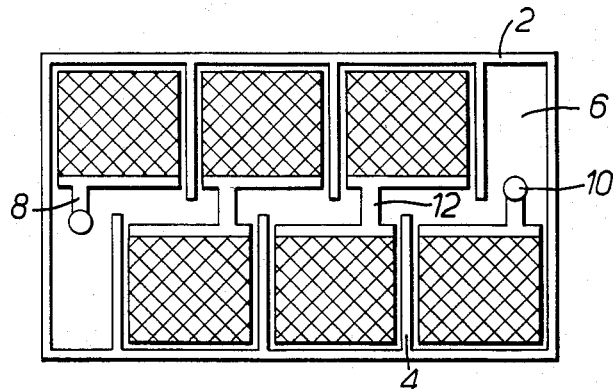
FIG. 3 is a view similar to FIG. 2 showing only the layer of plates below the top layer.
Figure 11:
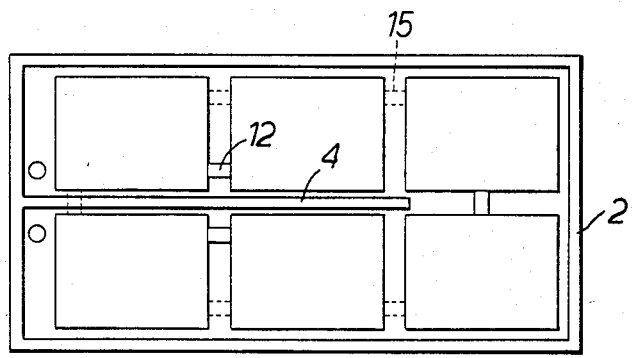
Figure 12:
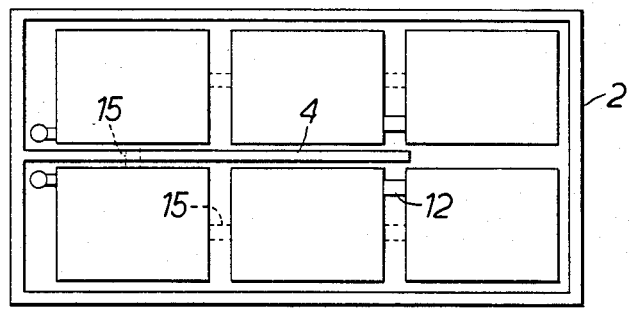
Figure 13:
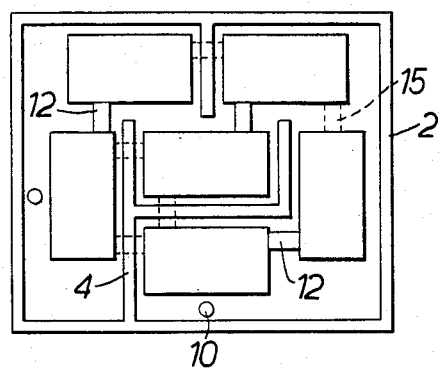
Figure 14:
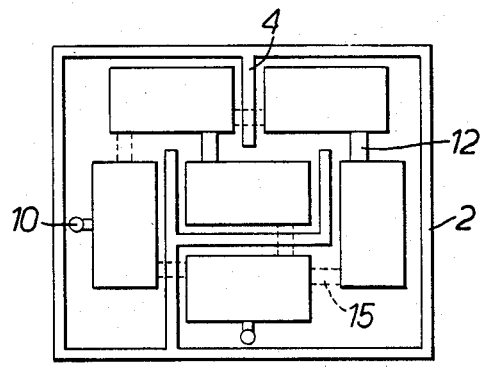

FIGS. 11 and 12 are views similar to FIGS. 2 and 3 respectively of an alternative embodiment; and FIGS. 13 and 14 are further views similar to FIGS. 2 and 3 respectively of a further alternative embodiment.

Figure 1:
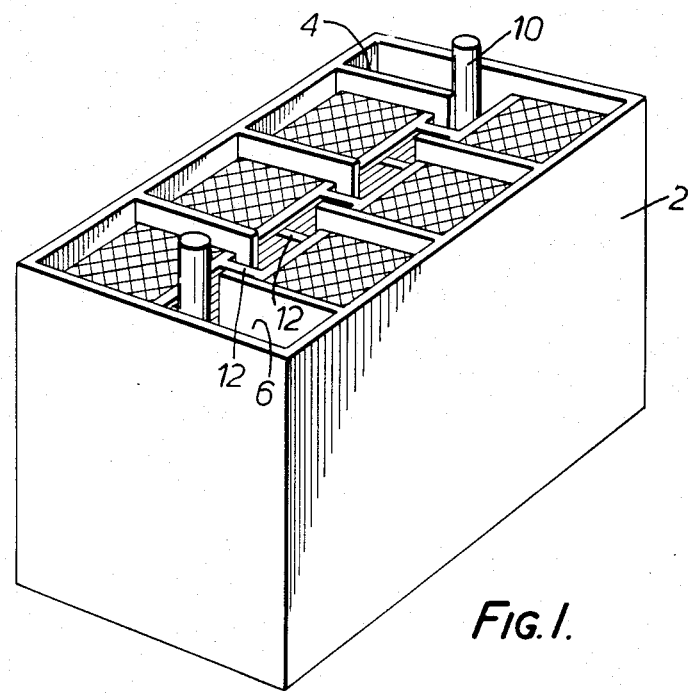
FIG. 1 is a perspective view of a 12 volt lead acid automotive battery of recombination type from which the lid has been omitted for the sake of clarity.

Referring first to FIGS. 1 to 3, the battery includes a rectangular section container 2 of polypropylene or like material integral with each of whose two longer sides are three intercell partitions 4. Each partition 4 extends substantially only to the longitudinal centre line of the container and the partitions on ones side of the container are offset from those on the other side by a distance substantially equal to one half of the distance between adjacent partitions. The partitions divide the interior of the container into two lines of three equally sized compartments at one end of which is an empty space 6 and at the other end of the other of which is a similar empty space.

Each compartment defined by the intercell partitions contains a stack of planar horizontal alternating positive and negative plates interleaved with compressible fibrous absorbent separator material, which in this case comprises a sheet of microfine glass fibres. Every alternate plate in the two end cells, that is to say the left hand cell in the upper line and the right hand cell in the lower line as seen in FIGS. 2 and 3, constitutes a unipolar plate having a lug 8 projecting therefrom. The lugs 8 are thus disposed in two vertical stacks which are connected to respective positive and negative terminal pillars 10 which are situated in the spaces 6 and which project through the battery lid. The remaining plates in the two end cells and all the plates in the other cells each constitute one half of a bipolar pair of plates whihc is connected to its other half in a cell in the other line of cells by an integral bridge piece 12 which extends perpendicular to the direction of the length of the lines of cells.

Each cell contains an amount of electrolyte which is insufficient to saturate the electrodes and separator material and if gas is evolved during charging of the battery this is induced to recombine within the battery. The container is sealed by a lid (not shown) which is provided with a single safety vent with which each cell communicates and through which gas may be vented if it is evolved at a rate in excess of that at which it can be recombined. The lid, or pads (not shown) on the underside of the lid engage the tops of the cell elements thereby restraining them against vibration and minimising the volume of the space in which a potentially explosive gas mixture may accumulate. As may be seen in FIG. 2, there is an appreciable gap between each cell and the adjacent side wall of the container to permit the ready introduction of the electrolyte into the battery and/or to accommodate excess electrolyte at the time when the battery is subjected to its initial formation.

In a modified construction, which is not illustrated, the bridge pieces 12 extend at an acute angle to the direction in which the lines of cells extend. This permits the empty spaces 6 to be reduced in volume but does not permit these to be dispensed with altogether when the container is of rectangular section.

Figure 4:
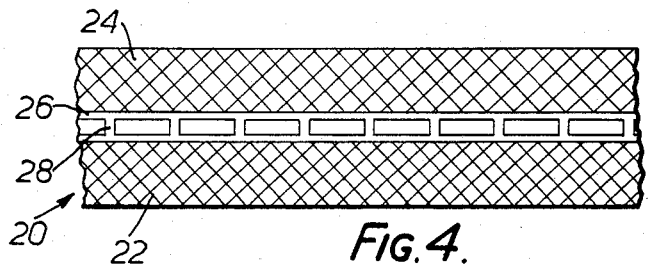
FIG. 4 is a plan view of a single expanded electrode member for use in the assembly of a battery in accordance with the invention.
Figure 5:
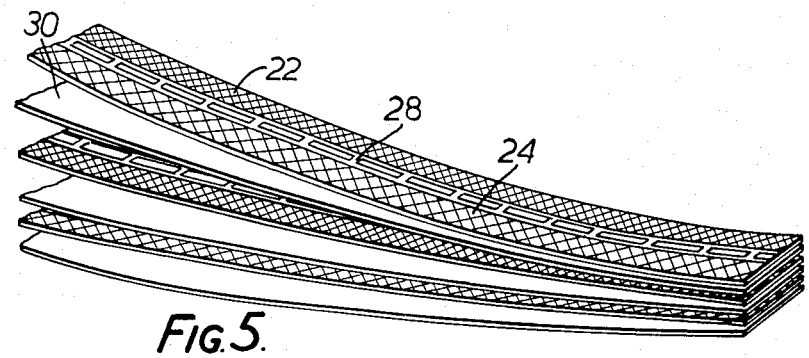
FIG. 5 illustrates diagrammatically the formation of the laminated structure of electrode members and separator material.

The battery is manufactured by a method which will now be described with reference to FIGS. 4 to 6. A plurality of elongate or continuous electrode members or grid arrays 20, of which one is shown in FIG. 4, are formed comprising two continuous spaced grids 22 and 24 of lead or lead alloy each having a respective selvedge 26. Each grid array is substantially symmetrical about a median line 40. The selvedges are integrally connected at spaced intervals by bridge pieces 28. The grid arrays may be cast in a conventional casting machine but in this embodiment a strip of lead or lead alloy is continuously expanded in an expander machine leaving an unexpanded central land from which rectangular portions are subsequently removed to form apertures separated by the bridge pieces 28. The grids 22 and 24 are then pasted with positive and negative active material respectively or alternatively they are both pasted with the same universal active material, that is to say an active material which can be electrolytically formed into either positive or negative active material. The grid structure of the positive grid 22 is preferably smaller than that of the negative grid 24 since positive active material may require more physical support than negative active material. The meshes of the grids are preferably of decreasing cross-section with increasing distance away from the bridge pieces 28 to optimise the electrical performance of the battery per unit weight of lead utilised. A plurality of pasted grid arrays, which may now be regarded as plate arrays, are then overlaid to form a composite laminated structure, shown diagrammatically in FIG. 5, with an elongate strip of microfine glass fibre separator material 30 interleaved between each adjacent pair of elongate grids 22, 24. The plate arrays are superposed such that each active area of each plate array is adjacent to an active area of opposite polarity on the or each adjacent plate array. In addition, adjacent plate arrays are offset longitudinally by half a pitch with the result that the bridge pieces of each plate array are adjacent to the centres of the apertures defined by the bridge pieces of the or each adjacent plate array.

After formation of the laminated structure a plurality of cuts 32 is made in each side of it extending over its full height and into the central spaces defined by the bridge pieces 28. The cuts on each side of the laminated structure are spaced apart by a distance equal to the spacing of the bridge pieces of the plate arrays and the cuts on the two sides are offset longitudinally by half a pitch. The laminated structure is thereby separated into two continuous spaced lines of stacks of separate plates of alternating polarity of which every plate is connected to a plate of opposite polarity in a stack of plates in the other line by an integral bridge piece and thus constitutes one half of a bipolar pair of plates. The cuts may be formed in any suitable manner which does not deform the cut edges of the plates sufficiently far that they contact an adjacent plate in the same stack and it is found that this may be conveniently performed by means of a high speed band saw.

The two lines of stacks of plates are interconnected by the bridge pieces which are disposed in a plurality of stacks, the bridge pieces in each stack alternately connecting a positive plate in one stack in one line to a negative plate in a stack in the other line and a negative plate in the one line to a positive plate in the other line. Selected stacks of bridge pieces are then severed at their central point, for instance by means of the high speed band saw, to separate the laminated structure into battery elements. It will be appreciated that the stacks of bridge pieces to be severed are selected in accordance with the number of cells to be possessed by the finished battery, and in the case of a six cell 12 volt battery every sixth stack of bridge pieces is severed. Each battery element thus has a stack of severed bridge pieces at each end and it will be appreciated that in the finished battery these are connected to the battery terminals. This latter operation may be performed in any convenient manner but in this embodiment the laminated structure is placed in a clamp for the severing operation and the bridge pieces of each of the two stacks of severed bridge pieces are connected together by forming a mould cavity around them whilst still in the clamp, for instance by means of a two part comb mould or by dipping them into a mould cavity into which molten lead or lead alloy is introduced. Each battery element is then placed into a battery container with integral intercell partitions as illustrated in FIGS. 1 to 3, for instance by lowering a battery container onto the battery element whilst it is supported on the bottom plate of the open clamp, or alternatively each stack of plates is placed within a respective plastics bag and the battery element then placed into a battery container having no fixed intercell partitions. It will be appreciated that in the assembled battery each stack of plates constitutes one cell and that each plate in the two end cells, that is to say the cells at the electrical end of the series-connected cells, whose bridge piece has been severed constitutes a unipolar plate and in connected to a terminal of the battery whilst all the remaining plates constitute one half of a bipolar pair of plates whose other half is in the other line of cells.

Electrolyte is added to the cells in any convenient manner either before or after the insertion of the battery element into the battery container in an amount insufficient to saturate the electrodes and separator material and after the sealing of a lid to the battery container the battery is then complete. The lid, or pads on the lid, exert a compressive force on all the cells thereby pressing the plates and separators into intimate contact which is believed to be necessary for efficient recombination operation. The formation of plate straps and intercell connectors is not required since each plate which constitutes one half of a bipolar pair of plates is connected to its other half by a bridge piece which constitutes an intercell connector and thus only terminal pillars need to be formed to connect together the two stacks of severed bridge pieces which pillars may extend through the lid or be subsequently connected to respective terminals projecting up from the battery lid.

In the method described above the battery is assembled from electrode members comprising two elongate expanded grids connected by spaced solid bridge pieces. Such electrode members are most conveniently made by expanding a metallic strip to leave an unexpanded central land from which portions are subsequently removed. This method is very wasteful of material and thus in an alternative method of assembly, which is not illustrated, each electrode member comprises an elongate metallic strip expanded over its entire area. The central portions removed from these strips are much shorter than in the case in which there is a central unexpanded land and the remaining bridge pieces preferably have a length of between ¼ and ½ of the pitch of the bridge pieces. The bridge pieces are thus themselves of expanded grid form but are found to perform their electrical function perfectly adequately. It will be appreciated that the wastage in this method is substantially reduced firstly because the removed portions are much smaller and secondly because the removed portions are expanded and not solid metal.

In the emobidments described above the electrode members or grid arrays and the plates of the finished battery comprise expanded metal and it will be appreciated that in this case the grids are not identifiable as such in the electrode members and after pasting but prior to cutting the individual plates also are not identifiable and only become identifiable once the cuts have been made and the pasted electrode members separated into individual stacks of plates. However, in a further embodiment, which will be described with reference to FIGS. 7 and 8, the plates are cut from a cast array of pasted interconnected grids comprising two lines of separately identifiable plates, the plates in each line being integrally connected by means of temporary links.

Figure 7:
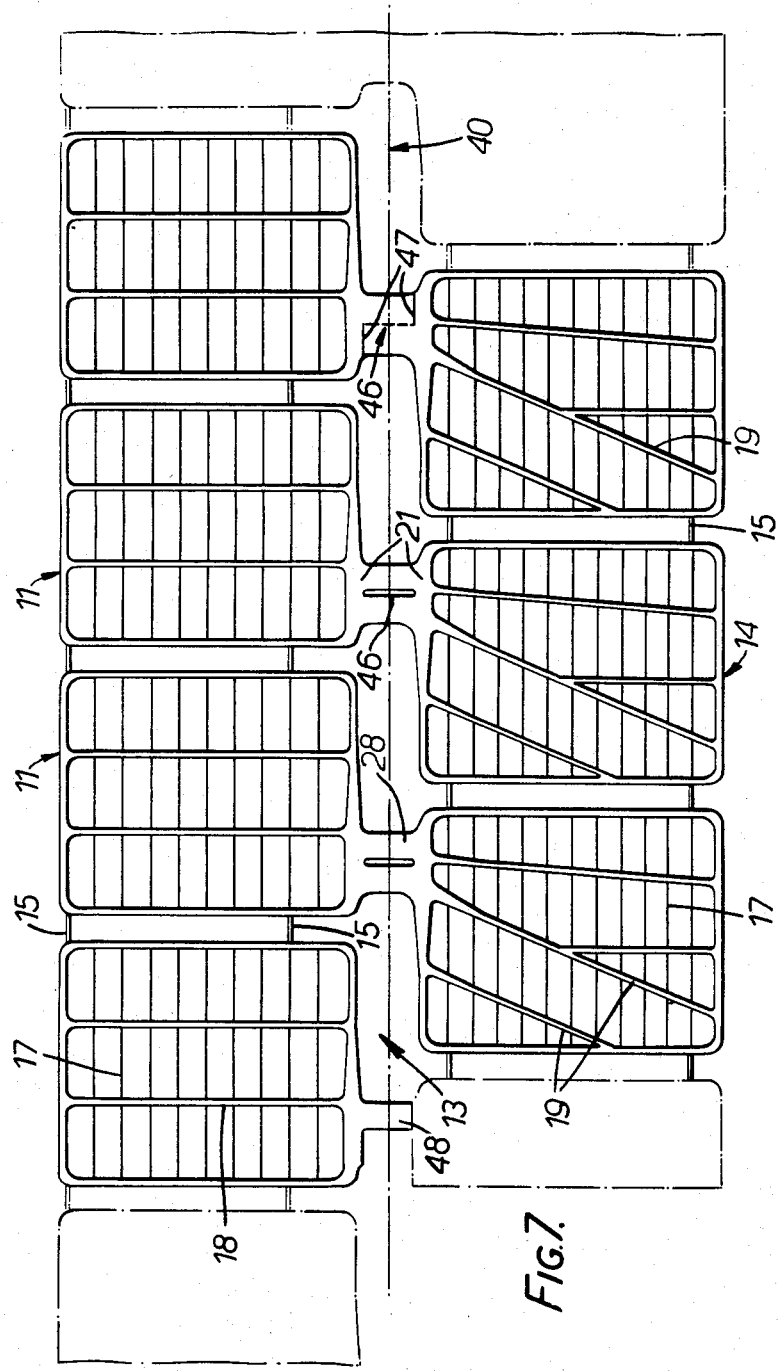
FIG. 7 is a plan view of a single cast electrode member or grid array for use in the assembly of an alternative construction of battery in accordance with the invention.

Referring now to FIG. 7, the battery grid array comprises a planar elongate strip of lead or lead alloy mesh which is continually cast on a casting machine generally of the type described in U.S. Pat. No. 4,349,067, a short length of which cast mesh is shown in FIG. 7. The casting is in the form of an array of grids arranged in two spaced parallel lines disposed on opposite sides of what may be termed a median line or line of symmetry 40. The grids 11 of one line are adapted to be formed into negative plates and are offset by half a pitch from the grids 14 of the other line which are adapted to be formed into positive plates. The two lines are separated by a gap 13 but each negative grid is integrally connected to a positive grid by a bridge piece or lug 28 which crosses the gap. The pitch of the lugs 28 is thus equal to the pitch of the grids in the two lines. The grids of each line are spaced apart but interconnected by integral temporary links 15 which give the cast elongate strip some stability but which are severed during assembly of the battery. Each grid is formed with bars 17 extending parallel to the length of the array which are closer spaced in the positive grids than in the negative grids. The negative grids also include bars 18 extending transverse to the length of the array whilst the positive grids include bars 19 generally radiating from the lugs 28. The grid frames are broadened adjacent their point of connection of the lugs 28, as indicated at 21. In general, the bars in the positive grids are wider than those in the negative grids and the thickness of the grids for a typical automotive battery is about one millimeter, or less. After casting, the strip is pasted, that is to say active material is applied to the grids. Thus positive and negative active material is applied to the lines of positive and negative grids respectively in any conventional manner.

Batteries are assembled from such pasted grid arrays, i.e. from plate arrays, by forming a laminated structure and then forming cuts in a manner similar to that described above. However, in this embodiment, the laminated structure is not continuous but each grid array is cut to the desired length prior to forming the laminated structure thereby avoiding the necessity of severing stacks of bridge pieces.

In one specific method of battery assembly a strip comprising 144 interconnecting grids of the form shown in FIG. 7 is cast, the two lines of grids are pasted with positive and negative active material respectively and a strip of separator material is then laid on each row of pasted grids, that is to say plates, and optionally lightly secured thereto. The strip is then severed into 24 arrays of 6 plates each by severing appropriate links 15 and bridge pieces 28 and the separator material overlying the links to be severed. A 24 layer laminated structure is then built up and it will be appreciated that this will necessitate the turning of every alternate plate array through 180° to permit the desired registry of plates of alternating polarity to be achieved.

When the laminated structure is separated into individual cell packs a total of four cuts is all that is required, each severing a temporary link 15 in each of the 24 layers. It will be appreciated that the unipolar plates in the two end cells, that is to say the cell at one end of one row and the other end of the other row, has a bridge piece which was severed prior to the formation of the laminated structure and thus terminates short of the other row.

Figure 6:
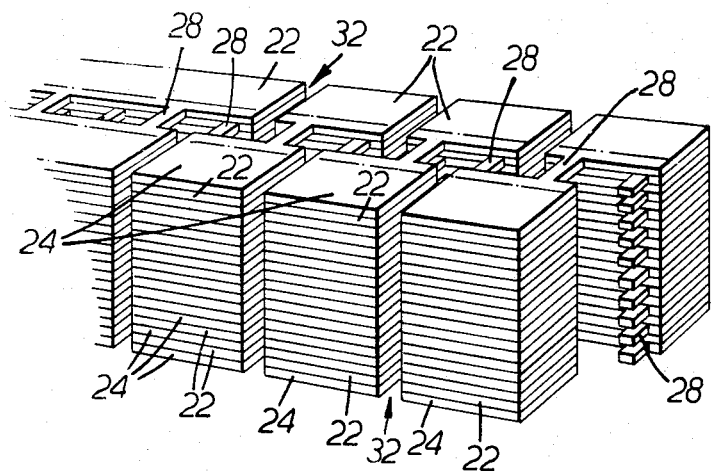
FIG. 6 shows the laminated structure after the cuts have been made in the two sides.

The resultant laminated structure is similar to that shown diagrammatically in the right hand half of FIG. 6. As in the previous embodiments the laminated structure may be many layers thick and the precise number of layers will be related to the desired current capacity of the battery. In the first, third, fifth, etc. layers of the laminated structure the negative plates are on one side and in the second, fourth, etc. layers the negative plates are on the other side of the laminated structure.

As may be seen in FIG. 7, each bridge piece 28 is separated into two by a central gap 46 extending parallel to its length, i.e. transverse to the length of the rows. When the continuously cast strip is separated into individual grid arrays every sixth bridge piece is severed also and this is done by forming two cuts 47 which communicate with the gap 46 to leave two full length but half width terminal connectors, designated 48 in FIG. 7.

After the laminated structure as been built up from individual plate arrays it is clamped, as before, to facilitate its separation into individual cell packs by severing the links 15. The connectors 48 are disposed in two vertical stacks and a tapered terminal pillar 57 is then formed around each such stack, preferably by pouring molten lead into a mould placed around the stack. The cross section of the terminal posts 57 increases such that at their take-off end the cross-section is equal to the aggregate cross-section of each of the stacks of bridge pieces 28, which of course constitute the intercell connectors in the finished battery. The terminal pillars are positioned as close as possible to the inner faces of the grids to minimise the internal resistance of the battery.

Figure 8:
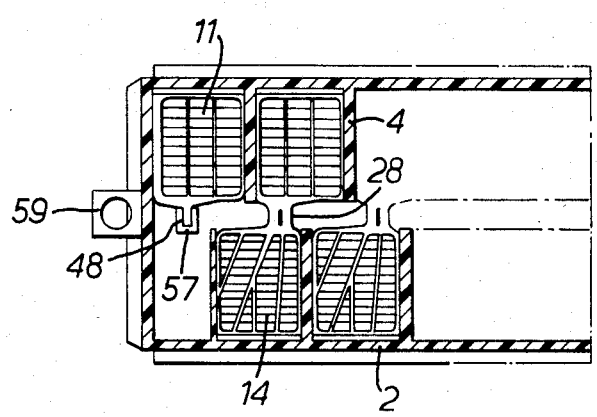
FIG. 8 is a view similar to FIG. 2 showing a battery assembled from cast plate arrays.

The severed structure is then placed as a unit into an outer container 2, seen in FIG. 8, of similar construction to that shown in FIG. 2. The battery is then filled with electrolyte and either before or after the addition of the electrolyte side terminal connectors 59 on the container are connected to the terminal posts 57 by resistance welding or the like. The battery is then electrolytically formed and the container sealed by a lid.

In the method referred to above, it is necessary to sever certain of the bridge pieces 28 to leave half connectors 48 to which terminal posts are connected. This is avoided in the modified construction of grid array shown in FIG. 9 in which those bridge pieces, which in the construction of FIG. 7 are severed, are cast integral with one grid but terminating short of the other row of grids and thus do not require to be severed. These bridge pieces or connectors are designated 48 and may be of simple rectangular shape. Alternatively, the end of these connectors may be inclined to the length of the connectors, either over their whole width, as shown in the right hand connector 48 in FIG. 9, or over only a proportion of their width as shown in the left hand connector 48 in FIG. 9. Such shaping of the connectors 48 is found to facilitate the formation of the terminal pillars, the reason for which is believed to be that the molten metal can more readily flow around the connectors 48 and reliably key to them.

In the grid arrays of FIGS. 7 and 9 the temporary links 15 are differently positioned in the two lines of grids such that when the laminated structure is built up the links in each layer are offset from those in the or each adjacent layer thereby substantially obviating the risk that the links of adjacent layers are "smeared" together when the cuts are formed which would lead to internal short-circuits in the finished battery.

Figure 10:
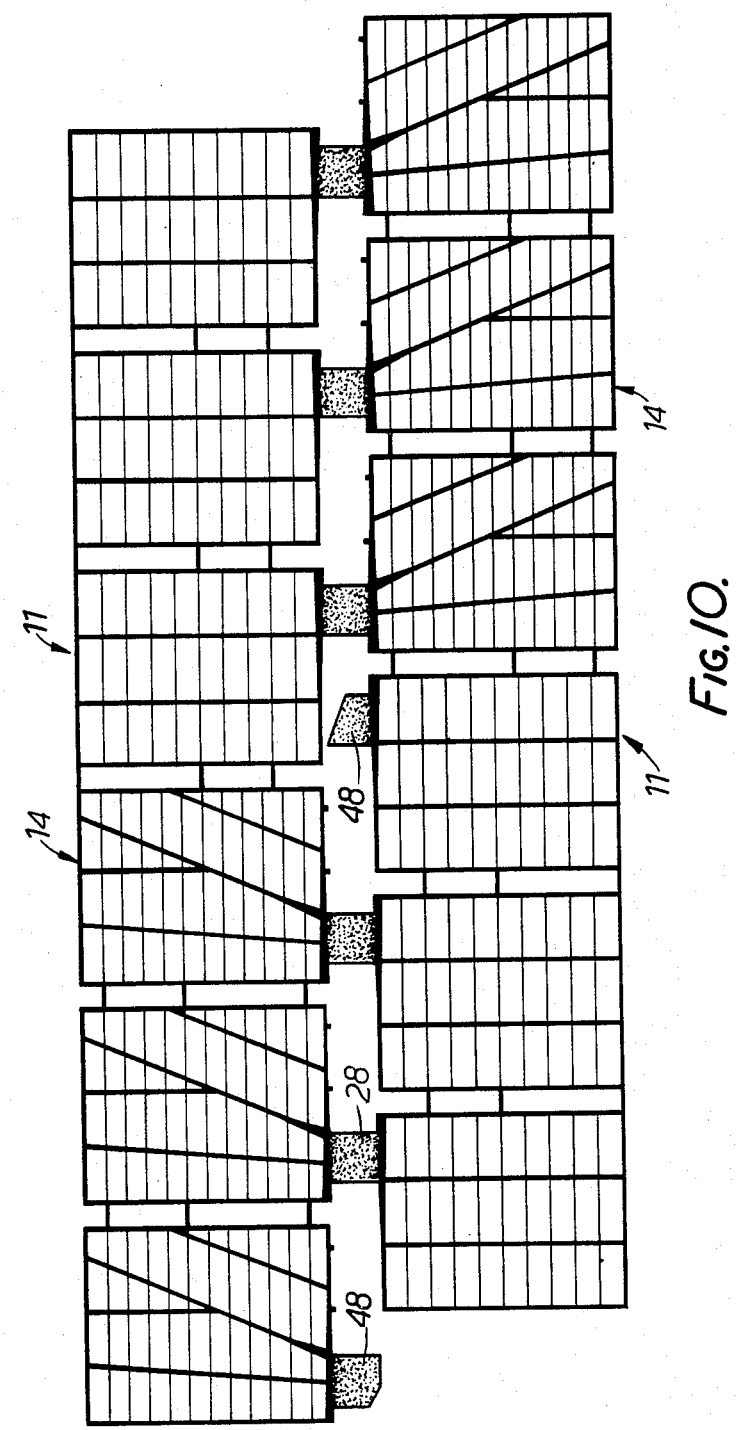

In a further modified construction of grid array shown in FIG. 10, the casting machine is modified so that each row of grids contains grids of positive type and of negative type which are associated with grids of opposite polarity type in the other row. In this case, each row includes groups of three positive plates alternating with three negative plates and it will be appreciated that this number is appropriate for a six cell battery and will be varied if the battery is to have a number of cells other than six. Certain bridge pieces are again discontinuous and have inclined ends, as described in connection with FIG. 9.

The advantage of this construction is that after separation of the cast strip into individual grid arrays, a laminated structure may be formed without the necessity of having to rotate every alternate array through 180°. In this construction the links 15 between the positive grids in each line are offset from those between the negative grids in the same line so that as in the previous constructions the links in adjacent layers in the laminated structure are laterally offset from one another. However manufacturing considerations may require that, if the pasting is to be effected in a rapid single pasting operation, the grids of each row are pasted with the identical active material and since both rows contain grids of both polarities, both rows are pasted with a universal active paste, that is to say active material paste which may be electrolytically formed into either positive or negative material. Alternatively, each grid may be pasted with an active material specific to the polarity which it is to adopt in the finished battery and this may be effected in any suitable manner, e.g. by manual pasting of the separate grids individually.

In the modified construction of 12 volt automotive battery illustrated diagrammatically in FIGS. 11 and 12 only one intercell connector, constituted by a stack of bridge pieces 12, extends between the two lines of cells and the other four such connectors extend in the direction of the length of lines, two being situated in each line. This avoids the necessity of offsetting the two lines of cells and the six cells thus have together a substantially rectangular shape in plan. In addition, the polarity of the plates in each line in each planar plate array is not the same, as is the case in the previous embodiments, but alternates in each line. Those pairs of cells which are directly connected by an intercell connector are maintained spaced apart only by the bridge pieces constituting the intercell connector whilst those cells which are adjacent but not directly connected, namely the left hand two cells in the upper and lower lines of cells as seen in FIGS. 9 and 10, are separated by an intercell partition 4 integral with the container 2.

Such a battery is assembled by casting a plurality of two types of grid array shown in FIGS. 11 and 12 respectively in which the grids are connected by integral bridge pieces and also by integral temporary links 15, which are shown in dotted lines. The types of array may be cast continuously in a single strip with the two types of array alternating in the strip and connected by temporary links which are severed prior to the formation of the laminated structure. The grid arrays are then all pasted with a universal active material or alternatively each grid is individually pasted with an active material which is specific to the polarity which it is to adopt in the finished battery. A laminated structure is then built up with the two types of plate array alternating and with each plate separated from the or each adjacent plate with which it is in registry by a strip of separator material. A total of six cuts are then made in the laminated structure to sever the temporary links 15 whilst leaving the bridge pieces 12. The battery is then completed as described above in connection with the previous embodiments.

In the still further construction of battery illustrated diagrammatically in FIGS. 13 and 14, the cells are not disposed in two rows but are assymmetrically disposed. The top layer of plates, and every alternate layer beneath it, comprises three bipolar pairs of plates 11, 14 of opposite polarity connected by a respective integral bridge piece 12 and the layer below the top layer and every alternate layer beneath that comprises two bipolar pairs of plates integrally connected by a bridge piece and two unipolar grids connected to respective terminal posts 10. Each cell comprises a stack of pasted grids by alternating polarity separated by a respective strip of separator material and each cell is maintained spaced apart from the or each cell to which it is directly connected by an intercell connector constituted by a stack of bridge pieces 12 by the said intercell connector only. Each cell is separated from the or each adjacent cell to which it is not directly connected by an intercell connector by an intercell partition 4 integral with the container 2.

Such a battery is assembled by forming a laminated structure of two alternating constructions of grid array having the grid configuration shown in FIGS. 13 and 14 respectively. The grids of each array are interconnected by the integral bridge pieces 12 and additionally by sufficient integral temporary links 15, which are shown in dotted lines, to impart adequate structural stability. A total of six cuts is then made to sever the links 15 whilst leaving the bridge pieces 12 and the battery is then completed as described above.

The term "batteries of the type containing substantially no mobile electrolyte" does not exclude the possibility that a small amount of free electrolyte may be present, at least at certain times. Thus after electrolytic formation there may be a small amount of free electrolyte present in a recombination battery but this will simply be electrolysed off once the battery is put into service thereby bringing the battery into a full recombination mode. Similarly, when a recombination battery is very deeply discharged a small amount of free water may be produced but this is reabsorbed when the battery is charged again.

Typical compositions for the positive and negative active material pastes are given in the table below:

|  | Positive | Negative |
|---|---|---|
| Grey Oxide (PbO) (Kilograms) | 13.62 | 13.62 |
| Barium sulphate (grams) | — | 68 |
| Carbon black (grams) | — | 23 |
| Lead Stearate (grams) | — | 7 |
| Lignosulphonate sold under the Trade Mark VANISPERSE (grams) | — | 45 |
| Polyester fibre (3 mm) (grams) | 11.5 | 11.5 |
| Water (liters) | 1.68 | 1.53 |
| $H_2SO_4$ (1.4 specific gravity) (liters) | 1.02 | 0.87 |

The sulphuric acid electrolyte added to the battery typically has a specific gravity of 1.24 and is added in an amount of 0.417 liters per kilogram of total active material in the battery.

The battery makes very economical use of lead because all the lead used during casting is included in the finished battery except for the small amount of lead forming the temporary interconnecting links.

In view of the fact that the plates in the finished battery are "horizontal" and may be retained horizontal at all times during assembly of the battery the plates may be designed primarily for electrochemical efficiency since mechanical strength and in particular bending rigidity is not an important requirement. This enables the plates to be substantially thinner than in a conventional battery which results in a more efficient utilisation of active material and the need for less metallic lead in the battery. This fact coupled with the fact that the intercell connections are integral and necessarily of the minimum theoretical length results in the peak current which the battery may produce being very high, which capability may result in the case of an automotive battery in the battery having a reduced weight and thus reserve capacity for a given cranking power which is a function of the peak current.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. A method of assembling a multicell electric storage battery having a plurality of cells, including two electrical end cells, electrically connected in series with each plate in each cell being substantially coplanar with one plate in every other cell comprising forming a laminated structure from a plurality of superposed substantially planar plate arrays, each array comprising both positive and negative plates and each plate being connected to at least one further plate in the same array by at least one link, the arrays being superposed in the laminated structure so that the plates of each array are in registry with those in each adjacent array and the superposed plates of adjacent arrays are of opposite polarity and separated by a separator material, and severing selected links to thereby form a battery element having a plurality of stacks of plates of alternating polarity, which stacks constitute the individual cells of the battery element and in which each plate, with the exception of every other plate in the stack of plates in the two electrical end cells, is electrically connected by an unsevered link to only a plate of opposite polarity in the same array, whereby the unsevered links connect the cells in series in the finished battery, and every alternate plate in the stacks of plates in the two electrical end cells is connected to no other plate.

2. The method of claim 1 in which the battery is a recombination battery and the separator material and plates are absorbent, including adding electrolyte to the stacks of plates and separator material in an amount sufficient to provide an electrical connection between the plates.

3. The method of claim 1 which includes placing the battery element into a container.

4. The method of claim 1 in which each plate includes a cast grid and the links include bridge pieces and temporary links, each grid in each array being connected to at least one further grid in the same array by a bridge piece or a temporary link, the temporary links being subsequently severed to from the battery element, and in which the arrays are superposed so that each temporary link in each plate array is not in registry with a temporary link in an adjacent array in the laminated structure.

5. A method of assembling an electric storage battery comprising providing a plurality of elongated plate arrays each having two rows of battery plates extending side-by-side, the plates of each row being connected and certain plates in one row being electrically connected by regularly spaced bridge pieces to a plate in the other row, forming a laminated structure by superposing the plate arrays interleaved with sheets of separator material in such a manner that each plate in each plate array is adjacent to a plate of opposite polarity in the adjacent plate array and the bridge piece of adjacent plate arrays are offset in the direction of the length of the rows thus forming a plurality of stacks of bridge pieces spaced apart in the direction of the length of the laminated structure, forming a plurality of cuts in each side of the laminated structure, the cuts on the two sides being offset in the direction of the length of the laminated structure do thereby form two lines of stacks of plates of alternating polarity of which certain plates in each line are connected to a plate of opposite polarity in the other line by a respective bridge piece and severing the laminated structure thereby removing from it a battery element comprising one or more stacks of plates.

6. The method of claim 5 in which the battery is a recombination battery and the separator material and plates are absorbent, including adding electrolyte to the stacks of plates and separator material in an amount sufficient to provide an electrical connection between the plates.

7. The method of claim 5 which includes placing the battery element into a container.

8. The method of claim 5 in which each plate includes a cast grid, each grid in each array being connected to at least one further grid in the same array by a bridge piece or a temporary link, the temporary links being subsequently severed to form the battery element, and in which the arrays are superposed so that each temporary link in each plate array is not in registry with a temporary link in an adjacent array in the laminated structure.

9. The method of claim 5 in which every stack of bridge pieces is severed and the resulting battery element is an individual stack of plates.

10. The method of claim 5 in which certain of the stacks of bridge pieces are not severed and the resulting battery element thus includes two or more stacks of plates.

11. A method of assembling a multicell electric storage battery having a plurality of cells, including two electrical end cells, electrically connected in series with each plate in each cell being substantially coplanar with one plate in every other cell comprising providing a plurality of elongated plate arrays each having two rows of battery plates extending side-by-side, the plates of each row being connected and certain plates in one row being electrically connected by regularly spaced bridge pieces to a plate in the other row, forming a laminated structure by superposing the plate arrays interleaved with sheets of separator material in such a manner that each plate in each plate array is adjacent to a plate of opposite polarity in the adjacent plate array and the bridge pieces of adjacent plate arrays are offset in the direction of the length of the rows thus forming a plurality of stacks of bridge pieces spaced apart in the direction of the length of the laminated structure, forming a plurality of cuts in each side of the laminated structure, the cuts on the two sides being offset in the direction of the length of the laminated structure to thereby form a battery element comprising two lines of stacks of plates of alternating polarity of which certain plates in each line are connected to a plate of opposite polarity in the other line by a respective bridge piece.

12. The method of claim 11 in which the battery is a recombination battery and the separator material and plates are absorbent, including adding electrolyte to the stacks of plates and separator material in an amount sufficient to provide an electrical connection between the plates.

13. The method of claim 11 which includes placing the battery element into a container.

14. The method of claim 11 in which each plate includes a cast grid, each grid in each array being connected to at least one further grid in the same array by a bridge piece or a temporary link, the temporary links being subsequently severed to form the battery element, and in which the arrays are superposed so that each temporary link in each plate array is not in registry with a temporary link in an adjacent array in the laminated structure.

15. A method of assembling a multicell electric storage battery having a plurality of cells, including two electrical end cells, electrically connected in series, with each cell being a stack of alternating positive and negative plates interleafed with separator material comprising:
  (a) providing a plurality of elongated and planar grid arrays of electrically conducting material, each array comprising at least two spaced rows of grids capable of being processed into the individual plates of the battery, with adjacent rows of grids connected by regularly spaced bridge pieces;
  (b) providing continuous sheets of electrically insulative separator material having a width approximately equal to the width of a single row of grids of the grid arrays;
  (c) pasting one grid row in each grid array with an active material capable of being electrolytically formed into one polarity and an adjacent grid row with an active material capable of being electrolytically formed into the opposite polarity;
  (d) forming a composite laminated structure from a plurality of superposed pasted grid arrays interleafed with the separator material, the grid arrays being superposed so that each grid row of one polarity is adjacent a grid row of the opposite polarity and separated therefrom by a respective sheet of separate material;
  (e) cutting the composite laminated structure transverse to the length of the rows to form lines of spaced stacks of discrete grids interleafed with separator material, the cuts being regularly spaced a distance equal to the spacing of the bridge pieces of the grid arrays; and
  (f) severing selected bridge pieces to form discrete grid arrays consisting of a predetermined number of grids corresponding to the number of cells of the battery, whereby a discrete battery unit is formed consisting of a plurality of stacks of alternating positive and negative plates interleafed with separator material, with each plate in each stack being connected to a plate in a stack in an adjacent row by a bridge piece but with every other plate in the two end stacks of the unit not being connected to another plate.

16. The method of claim 15, wherein the grid arrays are superposed so that the bridge pieces of adjacent grid arrays are offset longitudinally by half a pitch, whereby the bridge pieces of every other grid array are in registry, the rows of laminated grids being cut so that the spaced stacks of grids in one line are offset longitudinally by half a pitch from the spaced stacks in an adjacent line.

17. The method of claim 15, including connecting the severed bridge pieces of said every other plate in each end stack together to form the two terminals of the battery.

18. The method of claim 15, in which the battery is a recombination battery and the separator material and plates are absorbent, including adding electrolyte to the stack of plates and separator material in an amount sufficient to provide an electrical connection between the plates.

19. The method of claim 15, which includes placing the battery unit into a container.

20. The method of claim 15, wherein each row of grids of each grid array is a continuous strip of electrically conductive material.

21. The method of claim 20, wherein the grid is a continuous strip of expanded metal.

22. The method of claim 15, wherein each row of grids of each grid array is a row of discrete cast metal grids, each grid in each row being connected to a grid in an adjacent row in the array by a bridge piece and to an adjacent grid in the same row by at least one temporary link, the temporary links being cut to form the lines of spaced stacks of discrete grids.

23. The method of claim 15, wherein the grid arrays comprise two spaced parallel rows of grids.

24. The method of claim 23, wherein the bridge piece between every sixth and seventh stack of grids is severed to provide a six-cell 12 volt battery unit.

25. The method of claim 15, wherein the rows of grids are cut to the required length and the selected bridge pieces of the grid arrays are severed to form discrete grid arrays before the composite laminated structure is formed in step (d).

26. The method of claim 25, wherein the rows of grids are cut to the required length and the selected bridge pieces are severed after the grid arrays are pasted with the active material.

27. The method of claim 26, wherein the separator material is laid on each pasted grid row and is cut to the required length simultaneously with the cutting of the grid rows to the required length, the composite structure being formed from a plurality of these substructures each consisting of a grid array and separator material.

28. A method of assembling a multicell electric storage battery having a plurality of cells, including two electrical end cells, with each cell being a stack of alternating positive and negative plates interleafed with separator material and with each plate in each cell being electrically connected in series to a plate in an adjacent cell except for every other plate in each of the two end cells comprising:
   (a) providing a plurality of elongated and planar grid arrays of electrically conducting material, each array comprising at least two spaced rows of discrete cast metal grids, with each grid in each row being connected to an adjacent grid in the same row by at least one temporary link and also to a grid in an adjacent row in the array by a bridge piece except for those grids that become every other plate in the two end cells;
   (b) providing continuous sheets of electrically insulative separator material having a width approximately equal to the width of a single row of grids of the grid arrays;
   (c) pasting one grid row in each grid array with an active material capable of being electrolytically formed into one polarity and an adjacent grid row with an active material capable of being electrolytically formed into the opposite polarity;
   (d) forming a composite laminated structure from a plurality of superposed pasted grid arrays interleafed with the separator material, the grid arrays being superposed so that each grid row of one polarity is adjacent a grid row of the opposite polarity and separated therefrom by a respective sheet of separator material; and
   (e) severing temporary links between adjacent grids transverse to the length of the rows to form a battery unit consisting of a plurality of spaced stacks of alternating positive and negative plates interleafed with separator material, the number of stacks corresponding to the number of cells of the battery.

29. The method of claim 28, wherein the grids in one row are offset longitudinally by half a pitch from the grids in an adjacent row, the bridge pieces of adjacent grid arrays in the composite structure being offset longitudinally by half a pitch and the bridge pieces of every other grid array being in registry.

30. The method of claim 28, including providing connectors on said grids that become every other plate in each end cell and connecting them together to form the two terminals of the battery.

31. The method of claim 28, in which the battery is a recombination battery and the separator material and plates are absorbent, including adding electrolyte to the stack of plates and separator material in an amount sufficient to provide an electrical connection between the plates.

32. The method of claim 28, which includes placing the battery unit into a container.

33. The method of claim 28, wherein the grid arrays comprise two spaced parallel rows of grids.

34. The method of claim 33, wherein the battery unit is a six-cell 12 volt battery unit.

35. The method of claim 28, wherein certain temporary links of the grid arrays are first severed to provide discrete grid arrays having a number of grids corresponding to the number of cells in the battery before the composite laminated structure is formed in step (d), the remaining temporary links between the grids in the discrete grid arrays being severed in step (e) after the composite laminated structure is formed to provide the battery unit.

36. The method of claim 35, wherein said certain links are severed after the grid arrays are pasted with the active material.

37. The method of claim 36, wherein the separator material is laid on each pasted grid row and is cut to the required length simultaneously with the severing of the certain links, the composite structure being formed from a plurality of these substructures each consisting of a grid array and separator material.

* * * * *